N. Donaldson,
Cotton Planter.
No. 110,636. Patented Jan. 3, 1871.
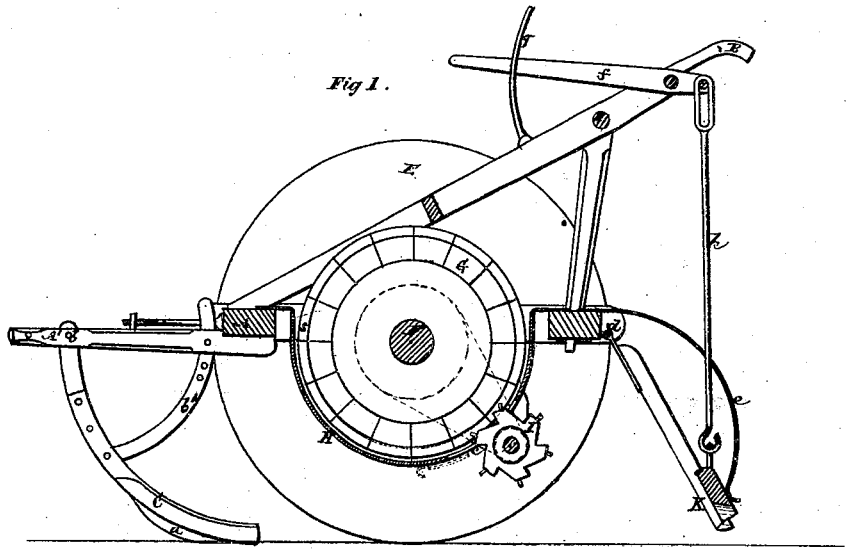
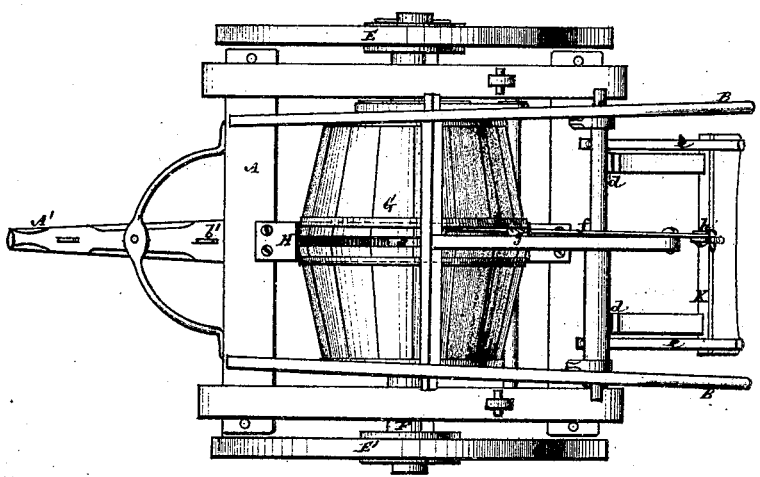

UNITED STATES PATENT OFFICE.

NIMROD DONALDSON, OF LINE CREEK, SOUTH CAROLINA.

IMPROVEMENT IN COTTON-PLANTERS AND MANURE-DISTRIBUTERS.

Specification forming part of Letters Patent No. 110,636, dated January 3, 1871.

*To all whom it may concern:*

Be it known that I, NIMROD DONALDSON, of Line Creek, in the county of Greenville and State of South Carolina, have invented a new and useful Improvement in Cotton-Planters and Manure-Distributers, of which the following is a full, clear, and exact description, reference being had to the accompanying drawing, forming part of this specification, and in which—

Figure 1 represents a vertical longitudinal section, and Fig. 2 a plan, of a machine constructed in accordance with my improvement. Fig. 3 is a side view of a plow attachment that may be used, when required, in place of the opener shown in Figs. 1 and 2.

Similar letters of reference indicate corresponding parts.

My invention is mainly designed for the planting of cotton-seed and distributing of manure, and by it labor is largely economized and accuracy insured.

The invention comprises a trench-opener, a revolving barrel-shaped seed or manure receptacle, together with a delivery-wheel arranged to operate in connection therewith, through an aperture in a guard, to the barrel, and an elastic coverer in rear of the machine.

Referring to the accompanying drawing, A is the frame of the machine; A', the draft bar or pole; and B B, the handles by which the machine is guided in being drawn over the ground. C is a curved opener, arranged in front, and made of diminishing width or thickness toward its outer edge, where it may be provided with a blade, *a*. Said opener is hung on a pivot, *b*, and made adjustable by means of a curved perforated bar, *b'*, or otherwise, to adapt it to work at different depths.

An opener thus constructed is free from the collection of trash, and will not hang upon any obstruction—such as rocks, roots, or other obstacles—that may be in the way, and it leaves a fair smooth opening for the reception of the seed.

When desired, a plow, D, as shown in Fig. 3, may, by simply removing a couple of bolts, be substituted for the opener.

The machine is supported on running-wheels E E', the one, E, of which is fast and the other, E', loose on the axle-tree F.

The seed to be planted is deposited in a barrel-shaped receptacle, G, arranged to occupy a horizontal position, and in concentric relation with the axle-tree, to which it is secured, so as to rotate therewith. Said barrel should be braced internally, to stiffen the staves and keep them true. The seed or guano, or manure and seed mixed, may be inserted within the barrel G through a lid provided in it for the purpose. Said barrel is made with an opening, *s*, around it at its largest diameter, which lies in line with or over the trench made by the opener. This opening *s* provides for escape of the seed or material from the barrel, that by its bilge shape secures, when revolving in common with the axle-tree, the escape of all the seed, the same being rolled over and over toward the opening *s* till no seed remains.

The opening *s* is guarded or covered by a curved guard, H, which may be made of hoop-iron, secured to the main frame, and which passes beneath the barrel in such relation with the opening *s* as to prevent the escape of seed except through an aperture, *c*, made in said guard, which aperture should be fitted with a slide to regulate the discharge from the barrel.

In rear of the barrel, and in proper relation with the aperture *c* in the guard, is a small delivery-wheel, I, which is revolved by belt from the axle-tree. This wheel is provided with teeth or hooks for drawing out the seed from the barrel through the opening *c* and depositing it in the trench made by the opener C.

After the seeds have been deposited they are covered by a coverer, K, hinged, as at *d*, to the main frame in the rear, and kept steadily pressed down by means of springs *e e*. The depth at which said coverer is made to operate may be adjusted by a lever, *f*, capable of being locked at different heights in a guide, *g*, and connected with the coverer by a rod, *h*.

By making the one running-wheel, E, fast and the other wheel, E', loose on the axle-tree the machine may be more readily turned and guided. Also, by throwing the weight on the loose wheel, the machine may continue to travel without imparting motion to the barrel G or delivering-wheel I, thus shutting off all escape of seed.

Although the machine has here been described mainly with reference to the planting of seed, it may be used for distributing guano or other manure, or the seed and manure may be put together into the barrel G, which, by its rotation, will serve to mix the same, as well as by its shape to work them toward a common delivery-opening.

What is here claimed, and desired to be secured by Letters Patent, is—

The opener C, constructed substantially as described, in combination with the revolving barrel G, the guard H, and the delivery-wheel I, and elastic coverer K.

NIMROD DONALDSON.

Witnesses:
M. G. BERRY,
I. Q. DONALDSON.